United States Patent
Ito et al.

(10) Patent No.: US 6,713,213 B2
(45) Date of Patent: Mar. 30, 2004

(54) NON-AQUEOUS ELECTROLYTE SECONDARY BATTERY WITH AN ORGANIC MAGNESIUM ELECTROLYTE COMPOUND

(75) Inventors: Shuji Ito, Nara (JP); Osamu Yamamoto, Hirakata (JP); Teruhisa Kanbara, Ikeda (JP); Hiromu Matsuda, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 239 days.

(21) Appl. No.: 09/886,180

(22) Filed: Jun. 21, 2001

(65) Prior Publication Data

US 2003/0054258 A1 Mar. 20, 2003

(51) Int. Cl.$^7$ ............................................. H01M 10/08
(52) U.S. Cl. ...................... 429/199; 429/347; 429/231.6
(58) Field of Search ............................. 429/199, 231.6, 429/347

(56) References Cited

U.S. PATENT DOCUMENTS 4,801,363 A * 1/1989 Gregory .................... 204/58.5

FOREIGN PATENT DOCUMENTS

| JP | 62-211861 A | 9/1987 | | |
|---|---|---|---|---|
| JP | 1-95469 A | 4/1989 | | |
| JP | 4-28172 A | 1/1992 | | |
| JP | 11-010196 | * 2/1999 | .......... | H01M/10/40 |
| JP | 2000-173648 | * 6/2000 | .......... | H01M/10/40 |
| JP | 2000-353543 | * 12/2000 | .......... | H01M/10/40 |

OTHER PUBLICATIONS

Aurbach et al. Electrolyte Solutions for Rechargeable Magnesium Batteries Based on Organomagnesium Chloroaluminate Complexes, 2002, Journal of the Electrochemical Society, 149 (2) A115–A121.*

Liebenow, C., "A novel type of magnesium ion conducting polymer electrolyte," 1998, Pergamon, Electrochimica Acta, 43, vol. 10–11, 1253–1256.*

C. Liebenow, "Reversibility of Electrochemical Magnesium Deposition from Grignard Solutions", Journal of Applied Electrochemistry, vol. 27, 221–225 (1997).

* cited by examiner

Primary Examiner—Mark Ruthkosky

(57) ABSTRACT

In order to obtain a non-aqueous electrolyte secondary battery having a high capacity and excellent charge/discharge cycle characteristics, a halogen-containing organic magnesium compound represented by the formula (1): RMgX, where R is an aliphatic hydrocarbon group or an aromatic hydrocarbon group, X is fluorine atom, chlorine atom, bromine atom or iodine atom; or the formula (2): RMgY, where R is an aliphatic hydrocarbon group or an aromatic hydrocarbon group, Y is —$ClO_4^-$, —$BF_4^-$, —$PF_6^-$ or —$CF_3SO_3^-$ is added to the non-aqueous electrolyte.

9 Claims, 1 Drawing Sheet

NON-AQUEOUS ELECTROLYTE SECONDARY BATTERY WITH AN ORGANIC MAGNESIUM ELECTROLYTE COMPOUND

BACKGROUND OF THE INVENTION

The present invention relates to a non-aqueous electrolyte secondary battery having a high energy density and excellent cycle characteristics.

With the recent advancement of portable appliances and cordless appliances, there has been a demand for batteries having a high energy density in order to realize drive for long period. To meet this demand, attentions have been focused on such batteries as lithium ion secondary batteries and nickel-metal hydride storage batteries which use a hydrogen storage alloy in the negative electrode. Among them, those using metallic lithium in the negative electrode are promising in the viewpoint of a further higher capacity. However, a secondary battery using a multivalent cation of Mg, Al or the like is considered as a more promising battery system.

For example, a battery using magnesium in the negative electrode is expected to have a higher theoretical volume energy density than one using metallic Li, because two electrons transfer when 1 M of magnesium reacts in the negative electrode. Since magnesium is abundant in natural resources, low-priced and environmentally friendly, it is highly desired as a negative electrode material.

However, there has been a problem that the use of an aqueous solution as the electrolyte in a secondary battery containing magnesium makes the dissolution and precipitation of the magnesium difficult. This is because electrolysis of water occurs during charge owing to low hydrogen overvoltage. On the other hand, the use of a non-aqueous solvent as the electrolyte facilitates the dissolution and precipitation of the magnesium since it expands the range of the usable voltage (e.g., Japanese Laid-Open Patent Publication Nos. Sho 62-211861, Hei 1-95469 and Hei 4-28172; and Journal of Applied Electrochemistry, Vol. 27, 221-225, (1997)).

The cause that prevents the dissolution and precipitation of magnesium as described above is probably because a number of ions, which constitute a solvent, are present in the form of counter ions around a magnesium ion, which is a multivalent cation. Thus, the decomposition reaction of the electrolyte concurrently occurs, so that the dissolution and precipitation of magnesium does not occur in the amount corresponding to the amount of the current being passed.

In this respect, it has been reported that a highly efficient charge/discharge is possible only when the dissolution and precipitation of magnesium is attempted by the use of a tetrahydrofuran solution containing ethyl magnesium bromide dissolved therein (Journal of Applied Electrochemistry, Vol. 27, 221–225, (1997)).

However, as a result of study on a battery in which the above negative electrode was combined with a positive electrode, it was found that a bromine ion as a solute was oxidized on the positive electrode to generate a bromine gas, while the current is passed. Additionally, when tetrahydrofuran was used singly as a solvent, tetrahydrofuran was oxidized and decomposed on the positive electrode with the progress of charge/discharge cycles, thereby causing a significant decrease in the battery capacity.

In view of the above-described prior arts, an object of the present invention is to provide a non-aqueous electrolyte secondary battery having a high capacity and excellent charge/discharge cycle characteristics.

BRIEF SUMMARY OF THE INVENTION

The non-aqueous electrolyte secondary battery in accordance with the present invention comprising a rechargeable positive electrode, a non-aqueous electrolyte and a rechargeable negative electrode is characterized in that the non-aqueous electrolyte is added with a halogen-containing organic magnesium compound represented by the formula (1):

RMgX, (1)

where R is an aliphatic hydrocarbon group or an aromatic hydrocarbon group, X is fluorine atom, chlorine atom, bromine atom or iodine atom; or the formula (2):

RMgY, (2)

where R is an aliphatic hydrocarbon group or an aromatic hydrocarbon group, Y is $-ClO_4^-$, $-BF_4^-$, $-PF_6^-$ or $-CF_3SO_3^-$.

It is effective that the non-aqueous electrolyte contains at least one solvent selected from the group consisting of an ester type solvent, an amine type solvent, a nitrile type solvent, an amide type solvent, a sulfur type solvent and a linear ether type solvent; and a halogen-containing organic magnesium compound represented by the formula (1): RMgX, where R is an aliphatic hydrocarbon group or an aromatic hydrocarbon group, X is fluorine atom, chlorine atom, bromine atom or iodine atom.

The non-aqueous electrolyte preferably further contains a cyclic ether type solvent.

The ester type solvent is preferably propylene carbonate, ethylene carbonate, diethyl carbonate, dimethyl carbonate, methyl ethyl carbonate or γ-butyrolactone.

Further, the amine type solvent is preferably pyridine.

The nitrile type solvent is preferably acetonitrile.

The amide type solvent is preferably N-methylformamide or dimethylformamide.

The sulfur type solvent is preferably dimethylsulfoxide or sulfolane.

Further, the linear ether type solvent is preferably dimethoxyethane or diethyl ether.

The cyclic ether type solvent is preferably tetrahydrofuran or 2-methyltetrahydrofuran.

Further, in the present invention, it is effective that the non-aqueous electrolyte contains a halogen-containing organic magnesium compound represented by the formula (2): RMgY, where R is an aliphatic hydrocarbon group or an aromatic hydrocarbon group, Y is $-ClO_4^-$, $-BF_4^-$, $-PF_6^-$ or $-CF_3SO_3^-$.

In the formulae (1) and (2), the aliphatic hydrocarbon group R preferably has 1 to 4 carbon atoms.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
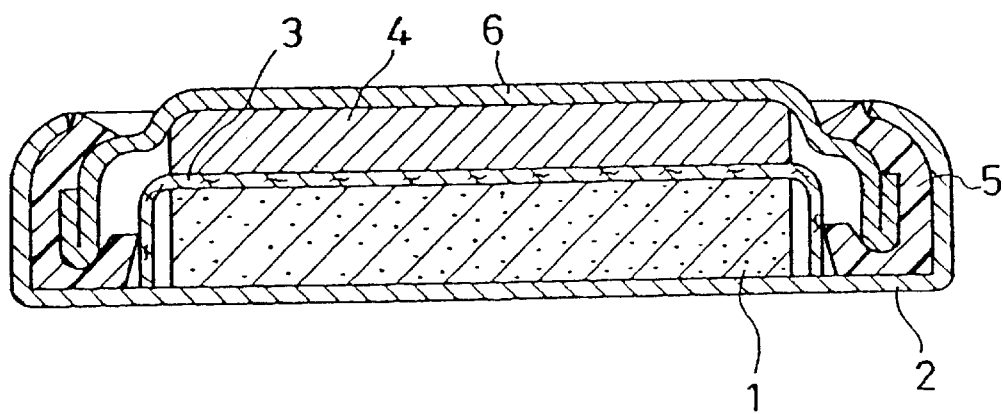
FIG. 1 is a schematic cross-sectional view of a coin battery fabricated in Examples of the present invention.

The most remarkable feature of the present invention lies in that a halogen-containing organic magnesium compound is added with the non-aqueous electrolyte of a non-aqueous electrolyte secondary battery comprising a rechargeable positive electrode, a non-aqueous electrolyte and a rechargeable negative electrode.

Preferred examples of the halogen-containing organic magnesium compound include a halogen-containing organic magnesium compound represented lay the formula (1): RMgX, where R is an aliphatic hydrocarbon group or an aromatic hydrocarbon group, X is fluorine atom, chlorine atom, bromine atom or iodine atom and a halogen-containing organic magnesium compound represented by the formula (2): RMgY, where R is an aliphatic hydrocarbon group or an aromatic hydrocarbon group, Y is —$ClO_4^-$, —$BF_4^-$, —$PF_6^-$ or —$CF_3SO_3^-$.

Particularly, when the halogen-containing organic magnesium compound represented by the formula (1) is used, it is preferred to use at least one solvent selected from the group consisting of an ester type solvent, an amine type solvent, a nitrile type solvent, an amide type solvent, a sulfur type solvent and a linear ether type solvent as the solvent for the non-aqueous electrolyte.

According to the present invention, a conventional problem of side reactions such as the decomposition of the electrolyte during charge/discharge can be suppressed by the use of such a non-aqueous electrolyte, thereby providing a non-aqueous electrolyte secondary battery which has a high capacity and excellent cycle characteristics.

Although the cause of such an effect is not known in detail, it seems to be attributable to the fact that the use of the above solvents improves the solvation property of magnesium thereby to expand the potential range of the battery.

As a solvent to be used in the non-aqueous electrolyte of the present invention, it is preferred to use one solvent selected from the group consisting of an ester type solvent, an amine type solvent, a nitrile type solvent, an amide type solvent, a sulfur type solvent and a linear ether type solvent because the abilities of these solvents to bond to a magnesium ion by solvation are considered to be weak.

Among these solvents, it is preferred to use a linear ether type solvent because its ability to bond to a magnesium ion by solvation is considered to be particularly weak.

Examples of the ester type solvent include, for instance, propylene carbonate, ethylene carbonate, diethyl carbonate, dimethyl carbonate, methyl ethyl carbonate, γ-butyrolactone, methyl acetate and ethyl acetate. Propylene carbonate, ethylene carbonate, diethyl carbonate, dimethyl carbonate, methyl ethyl carbonate and γ-butyrolactone are preferred because these solvents exhibit an excellent stability during charge/discharge. Further, it is particularly preferred to use methyl ethyl carbonate because it exhibits the most excellent stability during charge/discharge.

Examples of the amine type solvent include, for instance, pyridine and ethylenediamine. It is preferred to use pyridine because it exhibits an excellent stability during charge/discharge.

Examples of the nitrile type solvent include, for instance, acetonitrile and propiononitrile. Acetonitrile is preferred because it exhibits an excellent stability during charge/discharge.

Also, preferred examples of the amide type solvent are, for instance, N-methylformamide and dimethylformamide.

Further, preferred examples of the sulfur type solvent are, for instance, dimethylsulfoxide and sulfolane.

Preferred examples of the linear ether type solvent are, for instance, dimethoxyethane and diethyl ether.

When a plurality of solvents selected from the group consisting of an ester type solvent, an amine type solvent, an amide type solvent, a nitrile type solvent, a sulfur type solvent and a linear ether type solvent are used, the following combinations and mixing ratios are preferred in the viewpoint of the higher electrical conductivity and the excellent stability of the electrolyte during charge/discharge:

(1) 20 to 80% linear ether type solvent: and 80 to 20% ester type solvent (by volume)
(2) 20 to 80% linear ether type solvent and 80 to 20% amide type solvent (by volume)
(3) 20 to 80% linear ether type solvent and 80 to 20% amine type solvent (by volume)

Further, it is preferred that a cyclic ether type solvent be contained in the non-aqueous electrolyte in accordance with the present invention, because the cyclic ether type solvent has a low viscosity and is expected to further improve the electrical conductivity of the electrolyte.

As such a cyclic ether type solvent, it is preferred to use, for example, tetrahydrofuran or 2-methyltetrahydrofuran.

When the cyclic ether type solvent is used, the mixing ratio of at least one solvent selected from the group consisting of an ester type solvent, an amide type solvent, an amine type solvent, a nitrile type solvent, a sulfur type solvent and a linear ether type solvent; and the cyclic ether type solvent is preferably 2:8 to 8:2 (volume ratio), and more preferably 4:6 to 6:4 (volume ratio) in the viewpoint of improving the electrical conductivity of the electrolyte and ensuring the stability of the solvent mixture during charge/discharge.

As described above, the non-aqueous electrolyte in accordance with the present invention contains a halogen-containing organic magnesium compound represented by the formula (1): RMgX, where R is an aliphatic hydrocarbon group or an aromatic hydrocarbon group, X is fluorine atom, chlorine atom, bromine atom or iodine atom; or the formula (2): RMgY, where R is an aliphatic hydrocarbon group or an aromatic hydrocarbon group, Y is —$ClO_4^-$, —$BF_4^-$, —$PF_6^-$ or —$CF_3SO_3^-$. It should be noted that the solvent is not limited to the above solvents, particularly when the halogen-containing organic magnesium compound represented by the formula (2) is used.

These halogen-containing organic magnesium compounds enable a magnesium ion to transfer smoothly on the negative electrode and the positive electrode during charge/discharge, although the cause thereof is not known in detail.

In the formula (1): RMgX, R is an aliphatic hydrocarbon group or an aromatic hydrocarbon group. Examples of the aliphatic hydrocarbon group include, for instance, a methyl group, an ethyl group, a propyl group, an n-butyl group, a t-butyl group, an n-pentyl group and a t-pentyl group, each having 1 to 5 carbon atoms. Among them, an aliphatic hydrocarbon group having 1 to 4 carbon atoms is preferred because it gives an excellent stability to the electrolyte during charge/discharge.

Further, X is fluorine atom, chlorine atom, bromine atom or iodine atom, each of which is a halogen atom. Among them, fluorine atom is preferred because it gives an excellent stability to the electrolyte during charge/discharge.

Examples of the aromatic hydrocarbon group include, for instance, a phenyl group.

Next, in the formula (2): RMgY, R may be the same as in the formula (1). Also, Y is preferably —$ClO_4^-$, —$BF_4^-$, —$PF_6^-$ or —$CF_3SO_3^-$ in the viewpoint of further ensuring the stability of the electrolyte during charge/discharge. Preferred among them is —$CF_3SO_3^-$, which is most stable.

The non-aqueous electrolyte in the present invention contains at least one of the above-described solvents; and the halogen-containing organic magnesium compound represented by the formula (1) or (2).

The mixing ratio of each of the solvents and the halogen-containing organic magnesium compound may be in a range where the content of the halogen-containing organic magnesium compound in a non-aqueous electrolyte to be obtained is 0.1 to 2 M in the viewpoint of ensuring the electrical conductivity of the electrolyte for sufficiently transferring a magnesium ion during charge/discharge. Further, the content is preferably 0.5 to 1.75 M, and more preferably 0.75 to 1.5 M in the viewpoint of increasing the electrical conductivity of the electrolyte.

The non-aqueous electrolyte secondary battery in accordance with the present invention comprises a rechargeable positive electrode and a rechargeable negative electrode, in addition to the non-aqueous electrolyte described above.

The rechargeable positive electrode may be a conventional one, which contains, for example, an oxide such as $Co_3O_4$, $MnO_2$, $V_2O_5$ or AgO and a sulfide such as TiS. Particularly, $V_2O_5$ or AgO is preferred because they can absorb a magnesium ion easily.

Further, the rechargeable negative electrode may also be a conventional one, which contains, for example, metal magnesium, a magnesium alloy, graphite, carbon or a transition metal oxide. Particularly, metal magnesium or a magnesium alloy is preferred.

The non-aqueous electrolyte secondary battery in accordance with the present invention can be produced with any known method by the use of the above non-aqueous electrolyte, rechargeable positive electrode and rechargeable negative electrode. In other words, other constituent elements may be included in the battery as long as the effect of the present invention is not deteriorated.

Hereinbelow, the present invention will be described in further detail by way of examples, although the present invention is not limited thereto.

EXAMPLES 1 TO 14

In order to study the characteristics of batteries which used the electrolytes 1 to 14 obtained by dissolving 1 M of $C_2H_5MgBr$ (ethyl magnesium bromide) in the solvents listed in Table 1, coin batteries as shown in FIG. 1 were fabricated. FIG. 1 is a schematic cross-sectional view of the coin batteries 1 to 14 fabricated in this example.

As a negative electrode 4, metal magnesium with a purity of 99.9% was used.

Further, to 100 parts by weight of silver oxide (AgO), 5 parts by weight each of a polyethylene (PE) powder and acetylene black (AB) were added to obtain a mixture, and 0.05 g of this mixture was press-molded into a disc having a diameter of 17.5 mm to obtain a positive electrode 1. The positive electrode 1 thus obtained was placed in a case 2. Subsequently, a microporous separator 3 made of polypropylene was placed on the positive electrode 1.

The non-aqueous electrolyte prepared as described above was injected onto the separator 3. Then, the case 2 was sealed with a sealing plate 6 having a disc of metal magnesium with a diameter of 17.5 mm as a negative electrode 4 bonded to the internal surface and a polypropylene gasket 5 mounted on the periphery to produce a coin battery. As such, coin batteries 1 to 14 of the present invention were fabricated.

[Evaluation]

Each of the coin batteries thus obtained was discharged at a constant current of 1 mA until the battery voltage reached 1 V, and then charged at a constant current of 1 mA until the battery voltage reached 3 V. Thereafter, this charge/discharge cycle was repeated in the voltage range of 1 to 3 V, and the battery characteristics were evaluated. Herein, the discharge capacity per 1 g of the positive electrode active material was measured at 2nd and 50th cycles. The results were shown in Table 1.

TABLE 1

| Solvent | Discharge capacity Upper line (2nd cycle) Lower line (50th cycle) Solute: $C_2H_5MgBr$ |
|---|---|
| propylene carbonate | 416 |
|  | 364 |
| ethylene carbonate | 413 |
|  | 360 |
| diethyl carbonate | 415 |
|  | 368 |
| dimethyl carbonate | 417 |
|  | 370 |
| methyl ethyl carbonate | 417 |
|  | 373 |
| γ-butyrolactone | 414 |
|  | 360 |
| pyridine | 410 |
|  | 354 |
| acetonitrile | 412 |
|  | 353 |
| N-methylformamide | 420 |
|  | 383 |
| dimethylformamide | 416 |
|  | 382 |
| dimethylsulfoxide | 410 |
|  | 360 |
| sulfolane | 412 |
|  | 355 |
| dimethoxyethane | 416 |
|  | 384 |
| diethyl ether | 415 |
|  | 390 |

COMPARATIVE EXAMPLES 1 AND 2

Also, the comparative coin batteries 1 and 2 were fabricated in the same manner as previously described except for using the electrolyte obtained by dissolving 1 M of ethyl magnesium bromide in tetrahydrofuran; and the electrolyte obtained by dissolving 1 M of magnesium perchlorate $(Mg(ClO_4)_2)$ in propylene carbonate, and the battery characteristics were evaluated. The results were shown in Table 2.

TABLE 2

| Solute Solvent | Discharge capacity Upper line (2nd cycle) Lower line (50th cycle) |
|---|---|
| 1 M $C_2H_5MgBr$ | 405 |
| tetrahydrofuran | 106 |
| 1 M $Mg(ClO_4)_2$ | 105 |
| propylene carbonate | 0 |

The results in Tables 1 and 2 showed that each of the batteries of the present invention which used an ester type solvent, an amine type solvent, a nitrile type solvent, an amide type solvent, a sulfur type solvent or a linear ether type solvent had the initial discharge capacity of not less than 410 mAh/g and the discharge capacity at 50th cycle of not less than 350 mAh/g, and thus exhibited superior characteristics as compared to the batteries of the Comparative Examples. The improvement of the characteristics was presumably due to the fact that the use of the non-aqueous electrolyte in accordance with the present invention enhanced the stability of the solvent during charge/discharge, thereby expanding the usable potential range. Each of the batteries of the Comparative Examples increased in thickness after 50th cycle owing to the decomposition of the electrolyte inside the battery, whereas such an increase in thickness was hardly observed in the batteries of the present invention.

EXAMPLES 15 TO 56

The coin batteries 15 to 56 were fabricated in the same manner as in Example 1 except for using the non-aqueous electrolytes obtained by dissolving 1 M each of $C_2H_5MgF$, (ethyl magnesium fluoride), $C_2H_5MgCl$ (ethyl magnesium chloride) or $C_2H_5MgI$ (ethyl magnesium iodide) in the solvents listed in Table 3, and the battery characteristics were evaluated similarly. The results were shown in Table 3.

TABLE 3

| | Discharge capacity Upper line (2nd cycle) Lower line (50th cycle) | | |
|---|---|---|---|
| Solvent | Solute $C_2H_5MgF$ | Solute $C_2H_5MgCl$ | Solute $C_2H_5MgI$ |
| propylene carbonate | 420 | 418 | 412 |
| | 378 | 373 | 358 |
| ethylene carbonate | 421 | 417 | 412 |
| | 367 | 365 | 360 |
| diethyl carbonate | 423 | 420 | 411 |
| | 380 | 373 | 360 |
| dimethyl carbonate | 425 | 425 | 413 |
| | 382 | 375 | 360 |
| methyl ethyl carbonate | 424 | 423 | 413 |
| | 385 | 380 | 370 |
| γ-butyrolactone | 419 | 418 | 411 |
| | 365 | 363 | 352 |
| pyridine | 414 | 412 | 410 |
| | 359 | 357 | 351 |
| acetonitrile | 417 | 414 | 412 |
| | 363 | 360 | 351 |
| N-methylformamide | 425 | 423 | 415 |
| | 399 | 389 | 373 |
| dimethylformamide | 420 | 416 | 413 |
| | 395 | 390 | 370 |
| dimethylsulfoxide | 419 | 412 | 410 |
| | 368 | 364 | 353 |

TABLE 3-continued

| | Discharge capacity Upper line (2nd cycle) Lower line (50th cycle) | | |
|---|---|---|---|
| Solvent | Solute $C_2H_5MgF$ | Solute $C_2H_5MgCl$ | Solute $C_2H_5MgI$ |
| sulfolane | 415 | 414 | 412 |
| | 363 | 360 | 354 |
| dimethoxyethane | 422 | 418 | 413 |
| | 399 | 389 | 375 |
| diethyl ether | 422 | 419 | 413 |
| | 400 | 393 | 386 |

Table 3 showed that the batteries which used the non-aqueous electrolytes, each obtained by dissolving an ethyl magnesium halide in an ester type solvent, an amine type solvent, a nitrile type solvent, an amide type solvent, a sulfur type solvent or a linear ether type solvent, were superior in the initial capacity and the cycle characteristics as compared to the batteries of the above Comparative Examples. Also, the cycle characteristics were found to be dependent on the type of the halogen atoms as anionic species contained in the halogen-containing organic magnesium compounds. Namely, the halogen atom which provided the best cycle characteristics was fluorine atom, followed by chlorine atom, bromine atom and iodine atom in this order. This was presumably because the abilities of these halogen atoms to enhance the electrochemical stability of the halogen-containing organic magnesium compound were in the above order.

EXAMPLES 57 TO 126

In order to study the characteristics of each of the batteries which used the non-aqueous electrolytes obtained by dissolving 1 M each of $CH_3MgBr$ (methyl magnesium bromide), $C_3H_7MgBr$ (propyl magnesium bromide), $C_4H_9MgBr$ (butyl magnesium bromide), $C_5H_{11}MgBr$ (pentyl magnesium bromide) or $C_6H_5MgBr$ (phenyl magnesium bromide) in the solvents listed in Table 4, coin batteries were fabricated in the same manner as in Example 1, and evaluated under the similar conditions. The results were shown in Table 4.

TABLE 4

| | Discharge capacity Upper line (2nd cycle) Lower line (50th cycle) | | | | |
|---|---|---|---|---|---|
| Solvent | Solute $CH_3MgBr$ | Solute $C_3H_7MgBr$ | Solute $C_4H_9MgBr$ | Solute $C_5H_{11}MgBr$ | Solute $C_6H_5MgBr$ |
| propylene carbonate | 418 | 415 | 412 | 398 | 414 |
| | 370 | 364 | 358 | 324 | 363 |
| ethylene carbonate | 414 | 412 | 410 | 384 | 413 |
| | 365 | 355 | 350 | 316 | 356 |
| diethyl carbonate | 418 | 414 | 411 | 390 | 414 |
| | 377 | 364 | 358 | 320 | 362 |
| dimethyl carbonate | 418 | 415 | 411 | 388 | 414 |
| | 377 | 365 | 360 | 315 | 364 |
| methyl ethyl carbonate | 420 | 414 | 412 | 379 | 415 |
| | 380 | 370 | 365 | 323 | 370 |
| γ-butyrolactone | 415 | 412 | 409 | 368 | 411 |
| | 365 | 357 | 351 | 308 | 356 |
| pyridine | 413 | 408 | 405 | 352 | 409 |
| | 360 | 352 | 349 | 301 | 353 |
| acetonitrile | 414 | 411 | 408 | 348 | 410 |
| | 360 | 351 | 345 | 295 | 350 |

TABLE 4-continued

| | Discharge capacity Upper line (2nd cycle) Lower line (50th cycle) | | | | |
|---|---|---|---|---|---|
| Solvent | Solute CH$_3$MgBr | Solute C$_3$H$_7$MgBr | Solute C$_4$H$_9$MgBr | Solute C$_5$H$_{11}$MgBr | Solute C$_6$H$_5$MgBr |
| N-methylformamide | 421 | 417 | 414 | 395 | 416 |
| | 398 | 378 | 373 | 335 | 376 |
| dimethylformamide | 418 | 414 | 411 | 389 | 413 |
| | 395 | 378 | 370 | 330 | 377 |
| dimethylsulfoxide | 415 | 409 | 406 | 342 | 408 |
| | 372 | 356 | 350 | 289 | 355 |
| sulfolane | 418 | 410 | 407 | 343 | 410 |
| | 363 | 353 | 349 | 300 | 352 |
| dimethoxyethane | 418 | 413 | 411 | 389 | 414 |
| | 394 | 378 | 370 | 324 | 376 |
| diethyl ether | 417 | 412 | 409 | 391 | 411 |
| | 395 | 380 | 373 | 330 | 377 |

Table 4 showed that the batteries of the present invention were superior in the initial capacity and the cycle characteristics as compared to the batteries of the above Comparative Examples. The cycle characteristics were found to be dependent on the number of carbon atoms of the aliphatic hydrocarbon groups contained in the halogen-containing organic magnesium compounds. Namely, the aliphatic hydrocarbon group which provided the best cycle characteristics was a methyl group, followed by an ethyl group, a propyl group, a phenyl group, a butyl group and a pentyl group in this order. This was presumably because the abilities of these aliphatic carbon groups to enhance the electrochemical stability of the halogen-containing organic magnesium compound were in the above order. The batteries other than the ones using pentyl magnesium bromide were found to have the discharge capacity at 50th cycle not less than 340 mA/h g, and thus exhibited good cycle characteristics.

EXAMPLES 127 TO 238

In order to study the characteristics of each of the batteries which used the non-aqueous electrolytes obtained by dissolving 1 M of the ethyl magnesium halides shown in Tables 5 and 6 in the solvent mixture of the solvents listed in Tables 5 and 6 and a cyclic ether type solvent (tetrahydrofuran (Table 5) or 2-methyltetrahydrofuran (Table 6)) with the volume ratio of 1:1, coin batteries similar to Example 1 were fabricated and evaluated under the similar conditions. The results were shown in Tables 5 and 6.

TABLE 5

| Solvent (mixed with tetrahydrofuran at Volume ratio 1:1) | Discharge capacity Upper line (2nd cycle) Lower line (50th cycle) | | | |
|---|---|---|---|---|
| | Solute C$_2$H$_5$MgF | Solute C$_2$H$_5$MgCl | Solute C$_2$H$_5$MgBr | Solute C$_2$H$_5$MgI |
| propylene carbonate | 421 | 418 | 415 | 411 |
| | 381 | 373 | 360 | 355 |
| ethylene carbonate | 420 | 418 | 412 | 410 |
| | 366 | 362 | 360 | 358 |
| diethyl carbonate | 422 | 423 | 416 | 408 |
| | 378 | 370 | 366 | 359 |
| dimethyl carbonate | 424 | 423 | 416 | 413 |
| | 381 | 374 | 368 | 361 |

TABLE 5-continued

| Solvent (mixed with tetrahydrofuran at Volume ratio 1:1) | Discharge capacity Upper line (2nd cycle) Lower line (50th cycle) | | | |
|---|---|---|---|---|
| | Solute C$_2$H$_5$MgF | Solute C$_2$H$_5$MgCl | Solute C$_2$H$_5$MgBr | Solute C$_2$H$_5$MgI |
| methyl ethyl carbonate | 424 | 421 | 417 | 413 |
| | 382 | 381 | 371 | 368 |
| γ-butyrolactone | 418 | 417 | 411 | 409 |
| | 364 | 362 | 358 | 350 |
| pyridine | 415 | 413 | 411 | 409 |
| | 360 | 355 | 353 | 347 |
| acetonitrile | 415 | 412 | 414 | 410 |
| | 360 | 358 | 354 | 349 |
| N-methylformamide | 424 | 420 | 418 | 414 |
| | 392 | 390 | 379 | 374 |
| dimethylformamide | 421 | 417 | 418 | 414 |
| | 396 | 391 | 382 | 371 |
| dimethylsulfoxide | 420 | 414 | 408 | 408 |
| | 367 | 364 | 352 | 349 |
| sulfolane | 414 | 414 | 410 | 411 |
| | 360 | 359 | 353 | 348 |
| dimethoxyethane | 423 | 417 | 416 | 412 |
| | 399 | 390 | 385 | 374 |
| diethyl ether | 421 | 420 | 413 | 411 |
| | 394 | 393 | 387 | 384 |

TABLE 6

| Solvent (mixed with 2-methyltetrahydrofuran at Volume ratio 1:1) | Discharge capacity Upper line (2nd cycle) Lower line (50th cycle) | | | |
|---|---|---|---|---|
| | Solute C$_2$H$_5$MgF | Solute C$_2$H$_5$MgCl | Solute C$_2$H$_5$MgBr | Solute C$_2$H$_5$MgI |
| propylene carbonate | 418 | 416 | 414 | 408 |
| | 378 | 368 | 358 | 349 |
| ethylene carbonate | 417 | 416 | 411 | 408 |
| | 359 | 358 | 357 | 351 |
| diethyl carbonate | 418 | 418 | 412 | 409 |
| | 374 | 368 | 360 | 353 |
| dimethyl carbonate | 420 | 418 | 414 | 410 |
| | 380 | 370 | 362 | 355 |
| methyl ethyl carbonate | 420 | 417 | 414 | 408 |
| | 370 | 365 | 360 | 355 |
| γ-butyrolactone | 414 | 414 | 410 | 407 |
| | 360 | 358 | 354 | 348 |

TABLE 6-continued

| Solvent (mixed with 2-methyltetra-hydrofuran at Volume ratio 1:1) | Discharge capacity Upper line (2nd cycle) Lower line (50th cycle) | | | |
|---|---|---|---|---|
| | Solute C$_2$H$_5$MgF | Solute C$_2$H$_5$MgCl | Solute C$_2$H$_5$MgBr | Solute C$_2$H$_5$MgI |
| pyridine | 413 | 410 | 408 | 405 |
| | 357 | 354 | 350 | 346 |
| acetonitrile | 413 | 411 | 410 | 409 |
| | 357 | 354 | 350 | 348 |
| N-methylformamide | 420 | 418 | 416 | 410 |
| | 388 | 384 | 370 | 370 |
| dimethylformamide | 417 | 415 | 412 | 410 |
| | 390 | 384 | 375 | 368 |
| dimethylsulfoxide | 418 | 412 | 405 | 404 |
| | 362 | 360 | 351 | 348 |
| sulfolane | 410 | 410 | 404 | 402 |
| | 358 | 355 | 350 | 342 |
| dimethoxyethane | 418 | 414 | 411 | 410 |
| | 387 | 380 | 376 | 370 |
| diethyl ether | 418 | 416 | 411 | 410 |
| | 390 | 387 | 382 | 378 |

The results showed that the cycle characteristics were remarkably improved for the batteries of the present invention which used the non-aqueous electrolyte comprising the solvent mixture of a cyclic ether type solvent (tetrahydrofuran or 2-methyltetrahydrofuran) and at least one of an ester type solvent, an amine type solvent, a nitrile type solvent, an amide type solvent, a sulfur type solvent or a linear ether type solvent, as compared to the batteries of the Comparative Examples which used the solvent consisting only of tetrahydrofuran. In particular, the use of the solvent mixture of the cyclic ether type and the linear ether type solvents was found to give the initial capacity of not less than 408 mAh/g and the capacity at 50th cycle of not less than 348 mAh/g.

EXAMPLES 239 TO 302

In order to study the characteristics of the batteries which used the non-aqueous electrolytes obtained by dissolving 1 M of the halogen-containing organic magnesium compounds, each containing —ClO$_4^-$, —BF$_4^-$, —PF$_6^-$ or —CF$_3$SO$_3^-$ as an anionic species, in the solvents listed in Table 7, coin batteries were fabricated in the same manner as in Example 1 and evaluated under the similar conditions. The results were shown in Table 7.

TABLE 7

| Solvent | Discharge capacity Upper line (2nd cycle) Lower line (50th cycle) | | | |
|---|---|---|---|---|
| | Solute C$_2$H$_5$MgClO$_4$ | Solute C$_2$H$_5$MgBF$_4$ | Solute C$_2$H$_5$MgPF$_6$ | Solute C$_2$H$_5$MgCF$_3$S |
| propylene carbonate | 421 | 421 | 421 | 421 |
| | 385 | 387 | 392 | 393 |
| ethylene carbonate | 420 | 420 | 421 | 421 |
| | 370 | 375 | 378 | 380 |
| diethyl carbonate | 420 | 422 | 421 | 421 |
| | 382 | 390 | 395 | 394 |
| dimethyl carbonate | 424 | 424 | 424 | 424 |
| | 390 | 395 | 400 | 401 |
| methyl ethyl carbonate | 423 | 424 | 423 | 423 |
| | 391 | 396 | 402 | 400 |
| γ-butyrolactone | 420 | 421 | 421 | 420 |
| | 371 | 377 | 384 | 386 |
| pyridine | 415 | 416 | 417 | 417 |
| | 371 | 378 | 382 | 382 |
| acetonitrile | 418 | 418 | 419 | 417 |
| | 373 | 379 | 387 | 390 |
| N-methylformamide | 421 | 420 | 421 | 420 |
| | 399 | 402 | 407 | 405 |
| dimethylformamide | 421 | 422 | 421 | 420 |
| | 400 | 404 | 407 | 405 |
| dimethylsulfoxide | 418 | 417 | 418 | 417 |
| | 382 | 388 | 394 | 396 |
| sulfolane | 414 | 421 | 418 | 417 |
| | 382 | 387 | 393 | 393 |
| dimethoxyethane | 414 | 415 | 417 | 416 |
| | 385 | 380 | 385 | 384 |
| diethyl ether | 420 | 421 | 421 | 420 |
| | 402 | 405 | 408 | 407 |
| tetrahydrofuran | 406 | 409 | 409 | 409 |
| | 378 | 382 | 387 | 390 |
| 2-methyltetrahydrofuran | 405 | 407 | 408 | 407 |
| | 374 | 380 | 385 | 386 |

The results showed that the batteries of the the halogen-containing organic magnesium compounds, each containing —ClO$_4^-$, —BF$_4^-$, —PF$_6^-$ or —CF$_3$SO$_3^-$ as an anionic species, had the capacity at 50th cycle not less than 370 mAh/g, and thus exhibited excellent cycle characteristics.

EXAMPLES 303 TO 366 AND COMPARATIVE EXAMPLES 3 TO 4

Coin batteries were fabricated in the same manner as in Example 1 except for using the non-aqueous electrolytes obtained by dissolving 1 M of the halogen-containing organic magnesium compounds, each containing —ClO$_4^-$, —BF$_4^-$, —PF$_6^-$ or —CF$_3$SO$_3^-$ as an anionic species, in an ester type solvent, an amine type solvent, a nitrile type solvent, an amide type solvent, a sulfur type solvent or a linear ether type solvent listed in Table 8 and using the positive electrodes fabricated in the following manner.

To 100 parts by weight of vanadium oxide (V$_2$O$_5$), 5 parts by weight each of a polyethylene (PE) powder and acetylene black (AB) were added to obtain a mixture, and 0.05 g of this mixture was press-molded into a disc having a diameter of 17.5 mm to obtain a positive electrode (positive electrode 1).

Next, each of the non-aqueous electrolytes obtained by dissolving 1 M of the halogen-containing organic magnesium compounds in the solvents listed in Table 8 was injected onto the separator 3. The case 2 was sealed with the sealing plate 6 having a disc of metal magnesium with a diameter of 17.5 mm as the negative electrode 4 bonded to the internal wall and the polypropylene gasket 5 mounted on the periphery to produce a coin battery. As such, coin batteries 303 to 366 of the present invention were fabricated.

[Evaluation]

Each of the coin batteries thus obtained was discharged at a constant current of 1 mA until the battery voltage reached 2.5 V, and then charged at a constant current of 1 mA until the battery voltage reached 4 V. Thereafter, this charge/discharge cycle was repeated in the voltage range of 2.5 to 4 V, and the battery characteristics were evaluated.

Also, comparative coin batteries were fabricated in the same manner as in Example 1 except for using the electrolyte obtained by dissolving 1 M of ethyl magnesium bromide in a conventional tetrahydrofuran or the electrolyte obtained by dissolving 1 M of magnesium perchlorate in propylene carbonate, both shown in Table 9, and the characteristics thereof were evaluated similarly. The results were shown in Tables 8 and 9.

TABLE 8

| | Discharge capacity Upper line (2nd cycle) Lower line (50th cycle) | | | |
|---|---|---|---|---|
| Solvent | Solute $C_2H_5MgClO_4$ | Solute $C_2H_5MgBF_4$ | Solute $C_2H_5MgPF_6$ | Solute $C_2H_5MgCF_3SO_3$ |
| propylene | 131 | 132 | 132 | 132 |
| | 102 | 104 | 105 | 104 |
| ethylene carbonate | 132 | 132 | 132 | 133 |
| | 103 | 105 | 107 | 107 |
| diethyl carbonate | 130 | 131 | 131 | 132 |
| | 103 | 105 | 106 | 107 |
| dimethyl carbonate | 132 | 133 | 133 | 132 |
| | 105 | 106 | 106 | 106 |
| methyl ethyl carbonate | 131 | 132 | 133 | 132 |
| | 105 | 107 | 108 | 108 |
| γ-butyro-lactone | 129 | 130 | 130 | 129 |
| | 101 | 103 | 104 | 103 |
| pyridine | 129 | 130 | 131 | 130 |
| | 100 | 101 | 102 | 103 |
| acetonitrile | 129 | 131 | 131 | 131 |
| | 100 | 102 | 103 | 104 |
| N-methyl-formamide | 131 | 132 | 133 | 132 |
| | 103 | 103 | 104 | 105 |
| dimethyl-formamide | 132 | 133 | 134 | 134 |
| | 104 | 105 | 106 | 106 |
| dimethyl-sulfoxide | 129 | 130 | 131 | 131 |
| | 100 | 101 | 102 | 101 |
| sulfolane | 128 | 129 | 129 | 130 |
| | 100 | 101 | 101 | 101 |
| dimethoxy-ethane | 130 | 131 | 130 | 131 |
| | 100 | 101 | 102 | 103 |
| diethyl ether | 130 | 131 | 132 | 133 |
| | 103 | 104 | 105 | 105 |
| tetrahydro-furan | 128 | 129 | 130 | 130 |
| | 100 | 101 | 102 | 101 |
| 2-methyl-tetrahydro-furan | 127 | 128 | 129 | 129 |
| | 100 | 100 | 101 | 101 |

TABLE 9

| Solute Solvent | Discharge capacity Upper line (2nd cycle) Lower line (50th cycle) |
|---|---|
| 1 M $C_2H_5MgBr$ tetrahydrofuran | 125 54 |
| 1 M $Mg(ClO_4)_2$ propylene carbonate | 27 0 |

Tables 8 and 9 showed that each of the batteries of the present invention had the initial discharge capacity of not less than 125 mAh/g and the capacity at 50th cycle of not less than 100 mAh/g, and thus exhibited superior cycle characteristics as compared to the batteries of the Comparative examples. An increase in thickness after 50th cycle was hardly observed in the batteries of the present invention.

As described above, it was found that the use of electrolyte obtained by dissolving the halogen-containing organic magnesium compounds, each containing —$ClO_4^-$, —$BF_4^-$, —$PF_6^-$ or —$CF_3SO_3^-$ as an anionic species, in an ester type solvent, an amine type solvent, an amide type solvent, a nitrile type solvent, a sulfur type solvent or a linear ether type solvent brought a battery which exhibited excellent cycle characteristics even in the voltage range of not less than 3 V.

This was presumably because the use of —$ClO_4^-$, —$BF_4^-$, —$PF_6^-$ or —$CF_3SO_3^-$ as an anionic species in the halogen-containing organic magnesium compounds further enhanced the stability of the electrolyte.

As described above, according to the present invention, a non-aqueous electrolyte secondary battery having a higher energy density and excellent cycle characteristics can be provided by the use of an electrolyte obtained by dissolving a halogen-containing organic magnesium compound in an ester type solvent, an amine type solvent, an amide type solvent, a nitrile type solvent, a sulfur type solvent or a linear ether type solvent or in a solvent mixture of at least one of these solvents and a cyclic ether type solvent; and the electrolyte obtained by dissolving therein a halogen-containing organic magnesium compound containing at least one selected from the group consisting of —$ClO_4^-$, —$BF_4^-$, —$PF_6^-$ or —$CF_3SO_3^-$ as an anionic species.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A non-aqueous electrolyte magnesium secondary battery comprising a rechargeable positive electrode, a non-aqueous electrolyte and a rechargeable negative electrode, wherein said rechargeable negative electrode comprises magnesium, and wherein said non-aqueous electrolyte contains a halogen-containing organic magnesium compound represented by the formula (1):

where R is an aliphatic hydrocarbon group or an aromatic hydrocarbon group X is a fluorine atom, chlorine atom, bromine atom or iodine atom; or the formula (2)

where R is an aliphatic hydrocarbon group or an aromatic hydrocarbon group, Y is —ClO$_4^-$, —BF$_4^-$, —PF$_6^-$ or —CF$_3$SO$_3$.

2. The non-aqueous electrolyte magnesium secondary battery in accordance with claim 1, wherein said non-aqueous electrolyte contains at least one solvent selected from the group consisting of an ester solvent, an amine solvent, a nitrile solvent, an amide solvent, a sulfur solvent and a linear ether solvent.

3. The non-aqueous electrolyte magnesium secondary battery in accordance with claim 1, wherein said non-aqueous electrolyte further contains a cyclic ether solvent.

4. The non-aqueous electrolyte magnesium secondary battery in accordance with claim 1, wherein said aliphatic hydrocarbon group R has 1 to 4 carbon atoms.

5. The non-aqueous electrolyte magnesium secondary battery in accordance with claim 1, wherein said rechargeable negative electrode comprises magnesium metal or a magnesium alloy.

6. The non-aqueous electrolyte magnesium secondary battery in accordance with claim 1, wherein said non-aqueous electrolyte contains a halogen-containing organic magnesium compound represented by the formula (1):

RMgX     (1)

where R is an aromatic hydrocarbon group and X is a fluorine atom, chlorine atom, bromine atom or iodine atom.

7. The non-aqueous electrolyte magnesium secondary battery in accordance with claim 1, wherein said non-aqueous electrolyte contains a halogen-containing organic magnesium compound represented by the formula (1):

RMgX     (1)

wherein R is an aliphatic hydrocarbon group and X is a fluorine atom, chlorine atom, bromine atom or iodine atom.

8. The non-aqueous electrolyte magnesium secondary battery in accordance with claim 1, wherein said non-aqueous electrolyte contains a halogen-containing organic magnesium compound represented by the formula (2):

RMgY     (2)

where R is an aromatic hydrocarbon group and Y is —ClO$_4^-$, —BF$_4^-$, —PF$_6^-$ or —CF$_3$SO$_3$.

9. The non-aqueous electrolyte magnesium secondary battery in accordance with claim 1, wherein said non-aqueous electrolyte contains a halogen-containing organic magnesium compound represented by the formula (2):

RMgY     (2)

where R is an aliphatic hydrocarbon group and Y is —ClO$_4^-$, —BF$_4^-$, —PF$_6^-$ or —CF$_3$SO$_3$.

* * * * *